(12) United States Patent  
Edwards

(10) Patent No.: US 8,607,465 B1  
(45) Date of Patent: Dec. 17, 2013

(54) SLIDING T BEVEL WITH DIGITAL READOUT

(75) Inventor: Christopher L. Edwards, Wappingers Falls, NY (US)

(73) Assignee: General Tools & Instruments Company LLC, New York, NY (US)

( * ) Notice: Subject to any disclaimer, the term of this patent is extended or adjusted under 35 U.S.C. 154(b) by 68 days.

(21) Appl. No.: 13/218,922

(22) Filed: Aug. 26, 2011

(51) Int. Cl.
*B43L 7/10* (2006.01)

(52) U.S. Cl.
USPC .......................................................... 33/471

(58) Field of Classification Search
USPC .................................... 33/471, 470, 455, 464
See application file for complete search history.

(56) References Cited

U.S. PATENT DOCUMENTS

| | | | |
|---|---|---|---|
| 4,442,606 A * | 4/1984 | Graham et al. | 33/471 |
| 4,476,567 A | 10/1984 | Johnson | |
| 5,359,782 A | 11/1994 | Langmaid | |
| 5,647,135 A * | 7/1997 | Fuentes et al. | 33/494 |
| 5,713,135 A * | 2/1998 | Acopulos | 33/451 |
| 6,148,531 A | 11/2000 | Economuki | |
| 6,658,755 B2 * | 12/2003 | Arlinsky | 33/760 |
| 6,829,837 B2 * | 12/2004 | Williams | 33/473 |
| 7,299,560 B2 * | 11/2007 | Diaz et al. | 33/471 |
| D562,709 S | 2/2008 | Sterpka | |
| 7,401,416 B2 * | 7/2008 | Brooks | 33/760 |
| 7,574,813 B1 * | 8/2009 | Boutan | 33/471 |
| 7,726,034 B2 | 6/2010 | Wixey | 33/471 |
| 7,934,322 B2 | 5/2011 | Wixey | 33/471 |
| 2002/0088135 A1 * | 7/2002 | Arlinsky | 33/760 |
| 2006/0168835 A1 | 8/2006 | Casner | |
| 2007/0220764 A1 * | 9/2007 | Wolken | 33/427 |
| 2007/0283587 A1 * | 12/2007 | Cerwin | 33/471 |
| 2009/0038168 A1 * | 2/2009 | Wixey | 33/471 |
| 2010/0043243 A1 * | 2/2010 | Li et al. | 33/471 |
| 2010/0242292 A1 * | 9/2010 | Wixey | 33/471 |

OTHER PUBLICATIONS

General Tools & Instruments 1702 Digital Protractor.

* cited by examiner

*Primary Examiner* — Yaritza Guadalupe-McCall

(74) *Attorney, Agent, or Firm* — Leason Ellis LLP

(57) ABSTRACT

A digital T-bevel has a blade with a slot along a part of its length and a handle having an end that is mounted both to move along the length of the slot and to pivot with respect to the blade longitudinal axis. The handle also includes an encoder to measure the angle of the handle relative to the blade longitudinal axis and the necessary electronic circuitry to convert the measured angle into digital form to drive a display to visually display the numerical value of the measured angle.

5 Claims, 4 Drawing Sheets

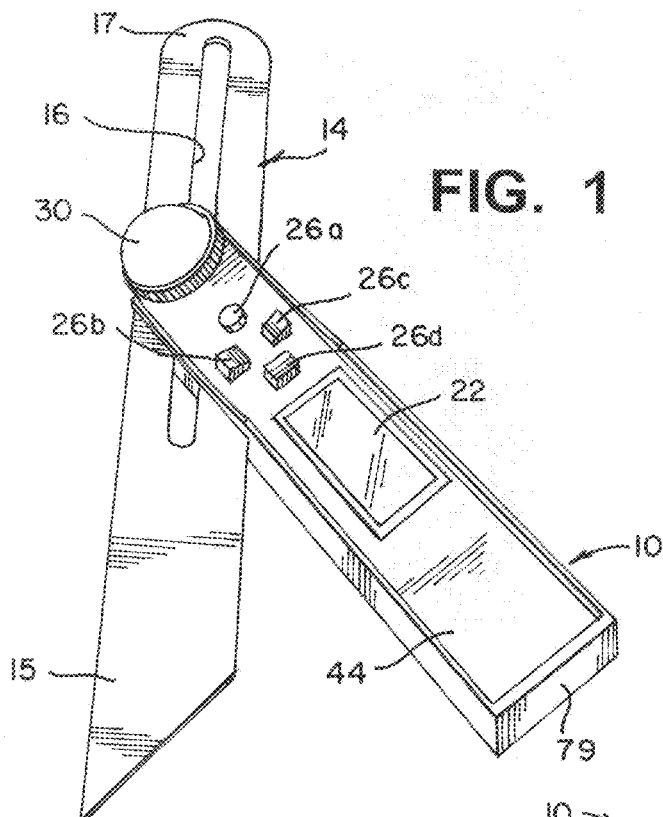
FIG. 1
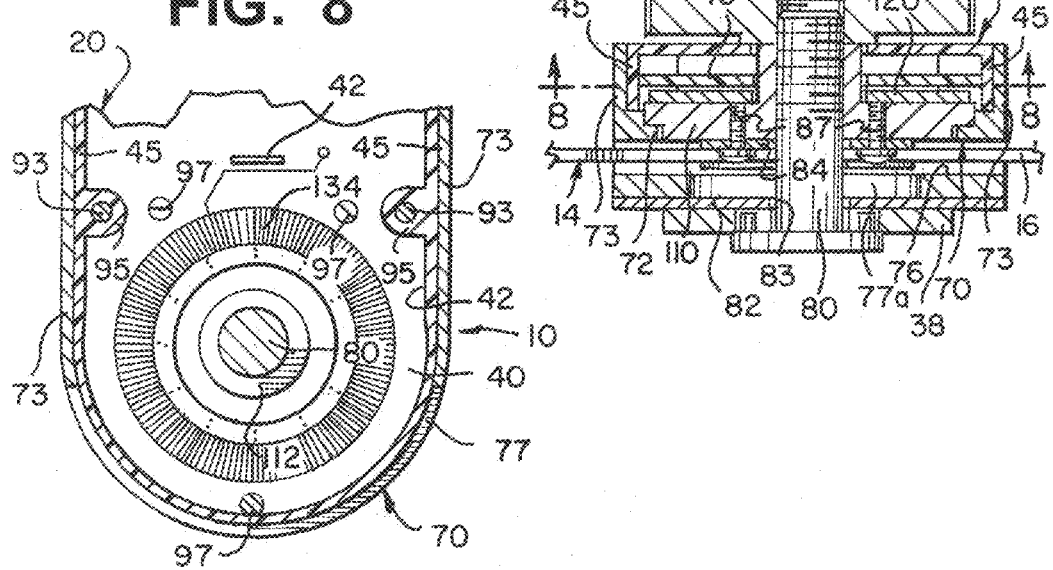
FIG. 7
FIG. 8

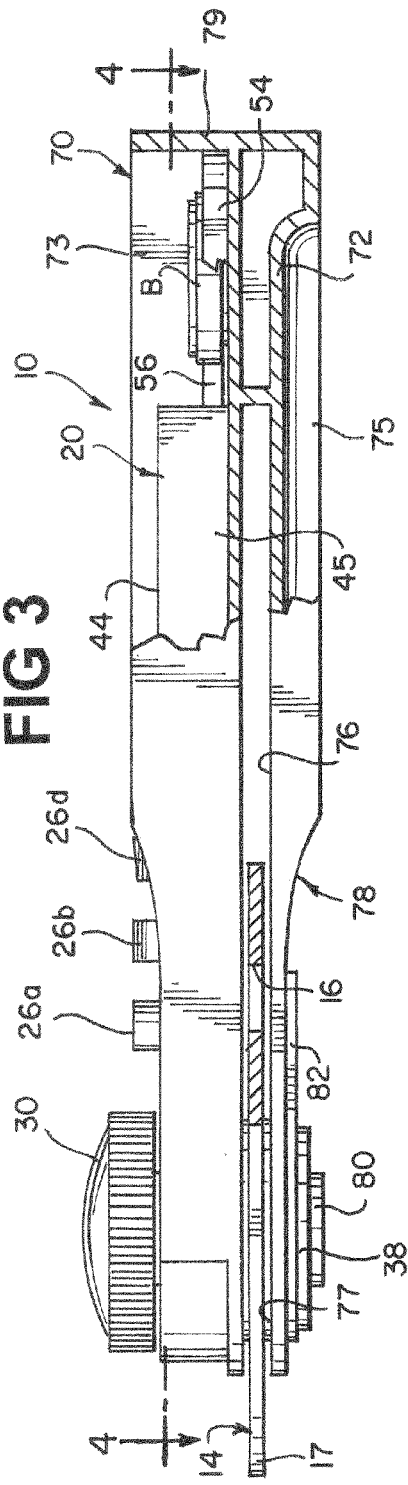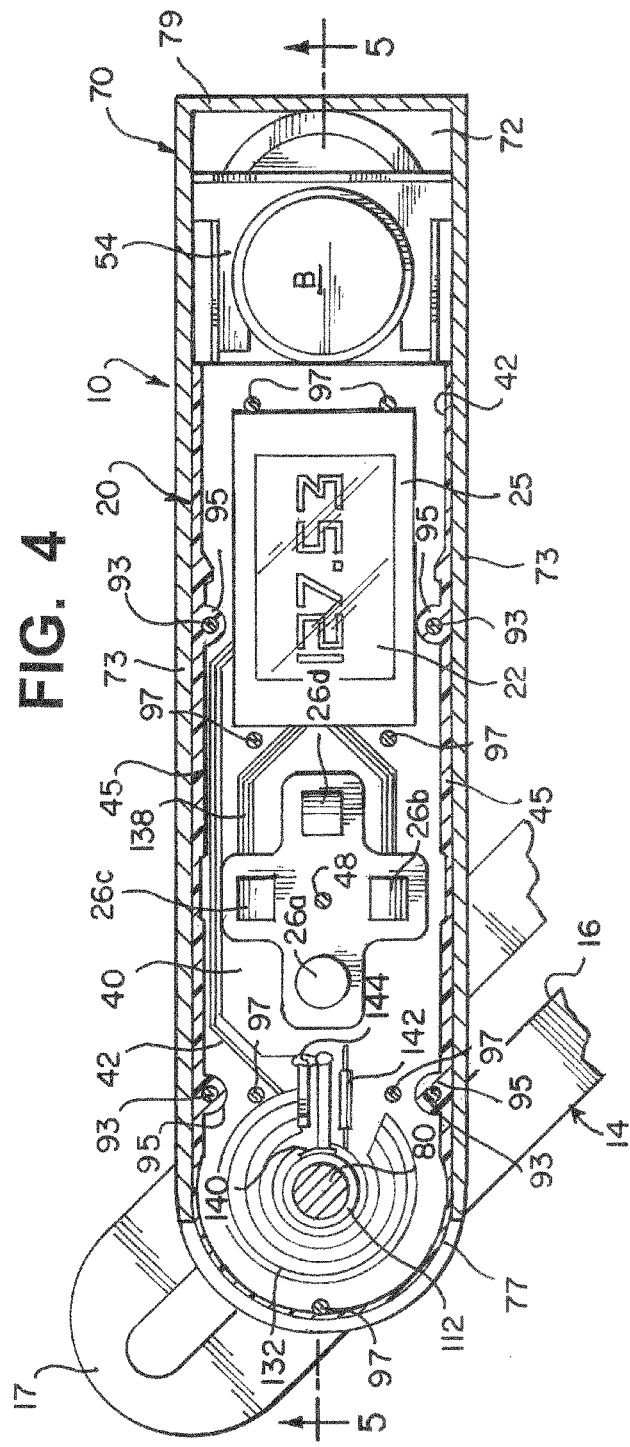

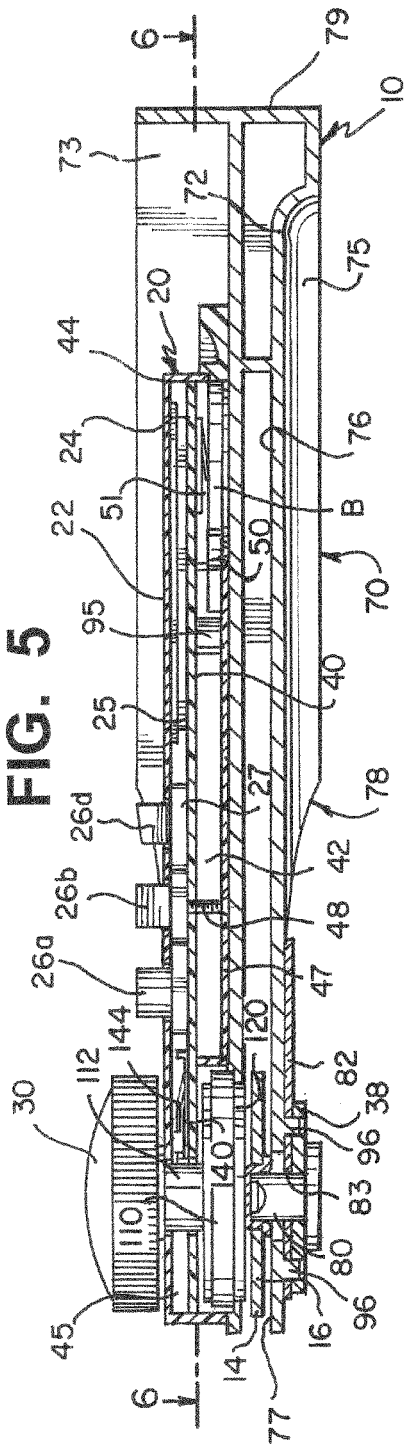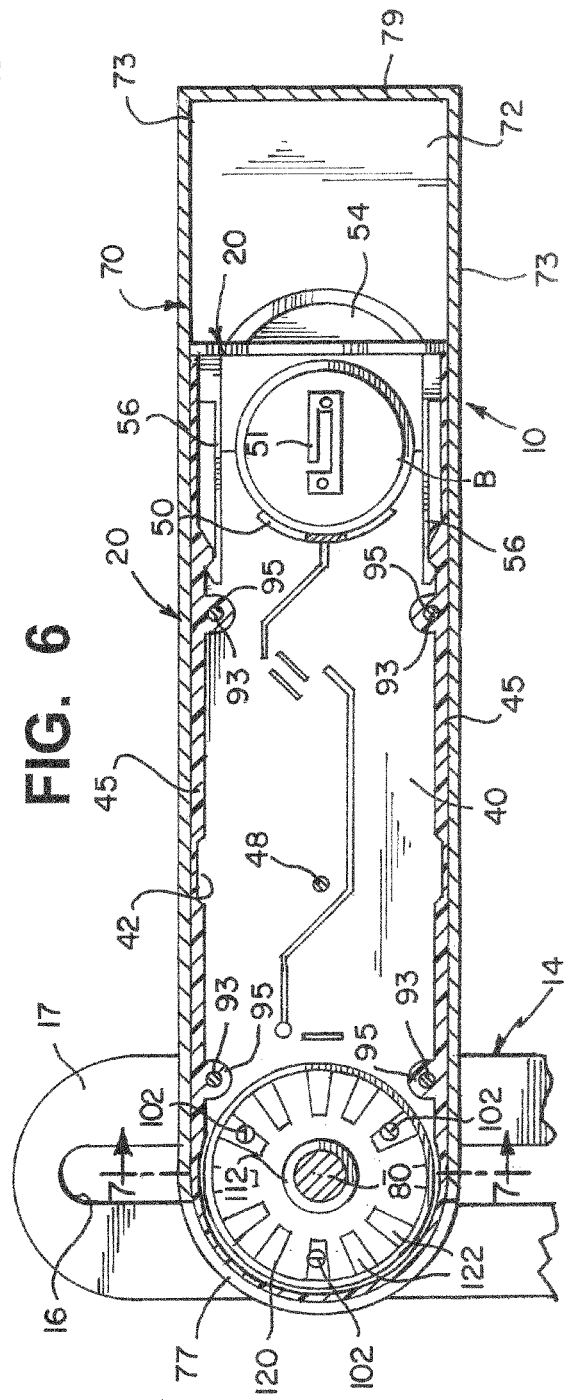

SLIDING T BEVEL WITH DIGITAL READOUT

BACKGROUND OF THE INVENTION

A sliding T bevel is an adjustable gauge for setting and transferring angles. The bevel has two main parts. There is an elongated blade, usually of metal, that has a slot along most of its length. There also is a swivel arm or handle, usually made of wood or plastic, which is connected is connected to the blade by a bolt that passes through the slot and which has a thumbscrew or wing nut. Upon loosening the thumbscrew the handle is positioned along the slot length and pivoted to an angle relative to the blade longitudinal axis. It is then locked in this position by tightening the thumbscrew.

Sliding T bevels are mostly used for measuring or transferring angles to be duplicated, such as the angle of the cut at the end of a board. In use, the blade is placed against the long edge of the board being measured and the thumbscrew is rotated to unlock the handle. While, the blade is held to the board edge the handle is moved to lie against the cut angle of the end of the board and is then locked into place. The angle measured can now be transferred to another piece of board whose end is intended to be cut at the same angle by placing the bevel on the new board.

If it is desired to measure and know the numerical value of the angle between the handle and the blade, then a protractor is often used with the sliding T bevel. While the use of the protractor in combination with the bevel accomplishes the desired purpose, it requires the use of two tools and making a separate measurement of the angle of the bevel handle. This is sometimes inconvenient to accomplish. Further, when using a mechanical type protractor it is sometimes difficult to obtain an angle measurement with the degree of accuracy desired, such as to one tenth of a degree. Digital protractors are available, such as one sold by General Tools & Instruments Co., LLC of New York, which can provide a more accurate angle readout. However, this still requires the purchase and use of two tools.

Therefore, it would be desirable to have a sliding T bevel in which the angle of the handle relative to the blade along which the handle slides and pivoted can be read out directly. This overcomes the disadvantages of having to have two tools and having to make a separate measurement of the angle at which the handle is fixed relative to the blade and can provide a more accurate measurement than is possible with a conventional mechanical protractor. The T bevel of the invention also eliminates the error that possibly could occur when using the protractor and eliminates the multiple errors possibly produced by the combined use of a standard T bevel and protractor.

BRIEF DESCRIPTION OF THE INVENTION

In accordance with the invention a digital T bevel is provided that includes a blade having a slot and a handle having a housing that includes a digital display. A guide member rides in the slot and is connected to the first part of an encoder that provides input signals to an electronic circuit that drives the display. A second part of the encoder is fixedly mounted to the handle housing. The handle has a threaded bolt having a head engaging the lower side of the housing and a shank that passes through the guide member and the first and second parts of the encoder. The bolt end is threaded into a control knob on the housing upper side.

Upon the control knob being loosened on the bolt thread, the handle is free to move along the length of the blade with the guide member riding in the slot. As the handle is pivoted about the bolt at any angle relative to the blade longitudinal axis the encoder second part rotates relative to the first part to produce signals corresponding to the angle. In a similar manner, rotation of the blade relative to the handle causes the guide member to rotate the encoder first part relative to the second part to produce the signals. The signals are applied to an electronic module having circuits that convert the angle of the handle relative to the blade longitudinal axis into digital data to drive the display for displaying the numerical value of the angle. Accordingly, a direct numerical readout of the angle is made available to the user of the T bevel without the need to use a protractor.

BRIEF DESCRIPTION OF THE DRAWINGS

Other objects and advantages of the present invention will become more apparent upon reference to the following specification and annexed drawings in which:

FIG. 1 is a perspective view of the digital T bevel of the invention;

FIG. 3 is a side view of the handle shown partly broken away and partly in cross-section;

FIG. 4 is a longitudinal section view of the handle taken in cross-section along lines 4-4 of FIG. 3;

FIG. 5 is a longitudinal section view of the handle taken along lines 5-5 of FIG. 4;

FIG. 6 is a longitudinal section view of the handle taken along lines 6-6 of FIG. 5;

FIG. 7 is a cross-section of the control knob part of the handle that slides along the blade taken along lines 7-7 of FIG. 6; and FIG. 8 is a partial cross-section view of the control knob part of the handle taken along lines 8-8 of FIG. 7.

DETAILED DESCRIPTION OF THE INVENTION

Figure 2:
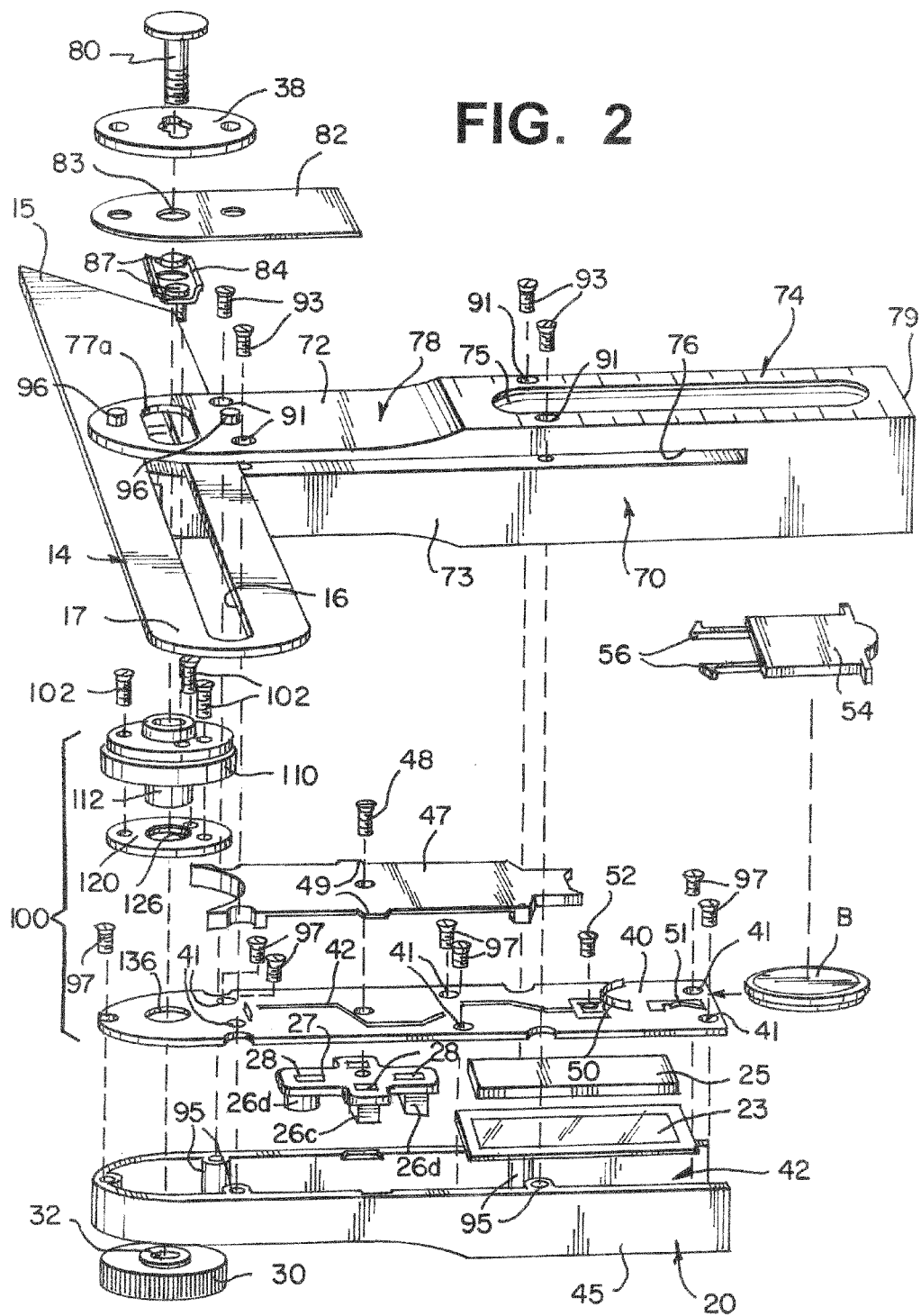
FIG. 2 is an exploded bottom perspective view of the bevel inserted from that of FIG. 1 and showing the various parts.

Referring to FIGS. 1 and 2, the sliding digital T bevel of the invention has two main parts. There is an elongated blade 14 with an angled and pointed front end 15 and a close curved rear end 17. The blade 14 is of a rigid material, such as stainless steel. The blade has an elongated slot 16 from near the midpoint that extends to near the blade curved rear end 17.

A rectangular shaped handle 10 is to slide along the length of the blade slot 16 and to be pivoted to an angle relative to the blade longitudinal axis. A control knob 30 on the upper side of the handle locks the handle along the blade length and at the angle to which it has been pivoted. As explained in greater detail below, the control knob 30 is associated with electronic apparatus that determines the angle to which the handle has been pivoted relative to the blade longitudinal axis. The handle includes a digital display 22, which numerically displays the angle to which the handle has been rotated relative to the blade longitudinal axis. There also are a plurality of control buttons 26 whose functions are described below.

The handle 10 is formed by a housing having upper and lower sections 20 and 70 (see FIG. 2) which preferably are made of a suitable high impact resistant molded plastic material or a die cast metal such as aluminum. Referring to FIGS. 2-8, the handle 10 upper section 20 has a hollow interior 42 between side walls 45 that extend upwardly from a top wall 44. An opening 24 is provided in the top wall 44 to for a protective window 23 for the digital display 22 (see FIG. 4). The display can be of any suitable conventional type such as LCD or LED that is driven by an electronics module 25 that also is mounted in the handle upper section 20. In FIG. 2, the display 22 is not visible since it is on the underside of the module 25. The display can have any number of digits depending upon the precision desired in the display of the measured angle. In a preferred embodiment of the invention, the display has five segments that allow for presentation of an angle with a one one hundredth degree precision, e.g. 127.53.

The housing upper section 20 also has openings for the buttons 26 that control the operation of the angle measuring and display functions performed by an angle encoder and an electronics module. A printed circuit board 40 is mounted recessed within the upper housing section 20 interior 42 held by screws 97 (FIGS. 2, 4 and 8) passing through holes 41 in the board that thread into corresponding bosses (not shown) molded on the inside of the section 20 top wall 44. The board 40 has wiring traces on both sides and has various through openings that are internally plated to electrically connect traces on the board upper and lower faces. All of this is conventional.

The electronics module 25 is mounted on the upper face (relative to the top wall 44 of the handle housing section 20) of the printed circuit board. The module 25 input is connected through wiring traces on the board to one part of an encoder 100 (described below) that produces signals corresponding to the handle angle pivot position relative to the blade. The electronics module has the necessary electronic circuits, including a dedicated pre-programmed micro processor or controller for converting the angle measured by encoder 100 into digital data and for driving the display 22 in response to the digital data. The display 22 can be mounted to or be part of the electronics module 25.

The control buttons 26 are mounted on a flexible pad 27 of electrically non-conductive material, such as of rubber or plastic, and each button has an electrical contact 28. The button electrical contacts 28 contact wiring traces 138 (FIG. 4) on the top face of the printed circuit which lead to the electronics module 25 so that when a button 26 is depressed it actuates a respective function programmed into the electronics module 25.

A rectangular shaped cover 47 of an electrical insulating material has tabs 49 that snap into the upper housing side walls 45 so that the cover overlies the wiring traces on the lower face of the circuit board 40. A screw 48 passes through a hole in the cover 47, circuit board 40 and the pad 27 to be threaded into a boss (not shown in FIG. 2) molded on the inside of the housing section 20 top wall 44 to fasten these components to the housing section 20.

A curved upstanding electrical contact plate 50 for a battery B is soldered to the circuit board 40 outside of the area of the cover 47. The battery, which preferably is of the lithium type, is held in the housing section 20 by a holder 54 that has flexible arms 56 which engage the interior of the housing 20 side walls 45. The holder 54 is manually pulled out of or pushed into the housing 20 to replace the battery. As shown in FIG. 6, the battery bottom face rests on a printed circuit trace contact 51 and there is a trace to the contact plate 50. This supplies the battery power through other traces to the electronics module 25, display 22 and encoder 100.

The lower housing section 70 has a bottom wall 72, side walls 73 and a rear wall 79. A ruler 74, preferably respectively in standard and metric units, is attached to or printed on each side of a depression 75 on the housing bottom wall 72. The housing 70 also has an elongated slot 76 along and through its main part into and through which the blade 14 can be rotated. That is, the blade and handle can be rotated a full 360° relative to each other. This allows the angle measurement to be made with the blade on either side of the housing. An elongated opening 77a is provided near and across the end of a thinned down section 78 of the top wall 74 above the elongated slot 76.

As shown best in FIGS. 2 and 7, an elongated guide piece 84 fits through opening 77a in the thinned down part 78 of the handle bottom wall into the blade slot 16. Upstanding walls on the guide piece 84 engage the inner sides of the blade walls that define the slot 16 so that the piece can be slid along the blade. The head of a threaded bolt 80 rests on one face of a washer 38 whose opposite face engages a plate 82 that is attached to the thinned down section 78 by a pair of spaced pegs 96 that extend through corresponding aligned holes in both the plate 82 and the washer 38. The bolt 80 has a threaded shank that passes through a hole 83 in plate 82 and also passes through opening 77a in the handle thinned down section 78, across the slot 76 and into an opening in the part of the handle housing 70 below the slot 76. The bolt shank then passes into and through central openings in a hub 110 and disc 120 which form a rotatable first part of the encoder 100. It then passes through an opening in the end part of the circuit board containing a second fixed part 130 of the encoder. The bolt also passes through an opening in the top wall of the handle section 20 to be fastened into a threaded hole 32 of the control knob 30.

A screw 87 at each end of the guide piece 84 fasten it to the encoder hub 110. Three screws 102 pass though the encoder hub 110 to fasten it to the disc 120. Since the guide piece 84 fits within the blade slot 16, when the control knob 30 is loosened the handle can be moved along the blade length. When the control knob 30 is loosened and the blade 12 is rotated relative to the handle 10, the guide piece 84 rotates the encoder first part hub 110 and disc 120 relative to the fixed second part 130 of the circuit board. Upon the handle being rotated relative to the blade, the encode second part 130 rotates relative to the first part 110, 120. As the rotation of one or both of the handle and blade relative to the other occurs, the encoder 100 produces signals that are supplied to the electronic circuit module 25 which produces the angle readout on the display 22.

The handle bottom section 70 has two oversize holes 91 (see FIG. 2) on the thinned down section 78 inward of the opening 77a for the guide piece 84 and two more approximately midway along its length with one each on opposite sides of the bottom wall depression 75. A screw 93 passes though each of the oversize holes 91 and has a head that rests on the lower surface of the handle slot 76 into which the blade 14 can be recessed. Each screw 93 is threaded into a corresponding threaded hole 95 in a boss on the inner surface of the upper handle section 20 to join the two housing sections 20 and 70 together.

The encoder 100 is conventional and is illustratively described as being of the rotary type such as used in the foregoing mentioned protractor sold by General Tool & Instrument. Any other suitable type of encoder can be used such as electro-optical, magnetic and capacitive such as described in U.S. Pat. No. 7,726,034 of Graham.

Rotary encoders are electro-mechanical transducers designed to transform mechanical shaft rotation into a series of electrical output signals, which provide angular positioning data of the shaft rotation. The signals are applied to an electronic circuit for conversion to digital form and display in numerical form. In the present invention rotation of the guide piece 84 around the bolt shank as the blade is rotated rotates the encoder hub 110 and disc 120 relative to the encoder second part 130 on the circuit board 40. Rotation of the handle rotates the encoder second part 130 around the bolt shank.

Referring to FIG. 2, the encoder first part is formed by the hub 110, which is of metal, and the attached disc 120. Disc 120 is a printed circuit board having a pattern of electrically conductive traces 122 (FIG. 6) around all or selected parts of its upper face (relative to the top of the handle). The encoder fixed second part 130 of the circuit board 40 that has a pattern of traces 132 on its upper face (FIG. 4) and a pattern of traces 134 on its lower face (FIG. 8). There can be through connections between the circuit board trace patterns 132 and 134. The traces 122 on the disc 120 contact the traces 134 on the circuit board 40 lower face. As is conventional, the patterns 122, 134 and 132 are arrayed such that as the handle and blade are rotated relative to each other signals are produced that correspond to the angular position of the handle relative to the blade longitudinal axis. Traces 136 (FIG. 4) on the circuit board top face connect the encoder output signals to the input of the electronic module 25.

The hub 110 has a cylindrical neck 112 (FIG. 2) through which the bolt 80 passes. The hub neck 112 passes through an opening 126 in the disc 120 and rests and rotates within an opening 136 in the circuit board 40. An arcuate shaped upstanding contact 140 contacts the hub neck 112 to provide a common connection to the electronic circuit module 25. There is a connection from the battery power supply to one end of the encoder total trace pattern on the disc 120 and two faces of the circuit board 40. This is illustratively through a resistor 142 to lower the voltage. The first end of a contact 144 is cantilever mounted on the board 40 and is connected to the electrical common contact 140. Contact 144 is of a somewhat resilient metal material, for example copper, and the part from the first end is above several of the traces 132 and has a downwardly extending second end. When the board 40 is fastened to the housing top section, the second end contacts an inner trace to complete the electrical part of the encoder trace pattern.

The trace pattern 122 of the disc 120 rides on and makes electrical contact with the trace pattern 134 on the lower face of the circuit board 40. When the blade is rotated relative to the handle, or vice versa, the encoder first part of the hub 110 and attached disc 120 rotates so that the contact pattern between the traces 122, 132 and 134 changes. In a manner that is conventional for rotary encoders, the patterns 122, 132 and 134 are configured to produce signals for the electronics module that correspond to the angle of the handle relative to the blade 12 longitudinal axis.

The functions of the digital T bevel are controlled by the buttons 26 as follows:
26a ON-OFF Switch that controls power from battery to encoder, display and electronics module.
26b ZERO Retract the blade fully into the handle slot 76 and press sets the angle displayed to zero (0).
26c REV Pressing displays the reverse (complement) of the measured angle. If angle measured is 45°, the pressing button will display 135° (180−45).
26d HOLD/FLIP Pressing the button holds the displayed number so that it will not change if the handle pivots relative to the blade. Holding the button down for three seconds causes the digits of the displayed number to flip from left to right to right to left.

In a typical use of the bevel of the invention to measure the angle of a cut at the end of a board or piece of molding, the edge of the blade is placed on the long side of the board. The control knob 30 is loosened so that the handle can be moved to a position such that the edge of the handle can be moved and rotated to lie against the angled cut. The control knob 30 is fastened and the angle of the cut will be shown on the display 22. The known numerical angle can be used for various purposes, such as setting a miter gauge on a saw to make a cut of the same angle in another board. This avoids the need to measure the angle with a protractor or to use the bevel itself to set the angle.

Specific features of the invention are shown in one or more of the drawings for convenience only, as each feature may be combined with other features in accordance with the invention. Alternative embodiments will be recognized by those skilled in the art and are intended to be included within the scope of the claims. Accordingly, the above description should be construed as illustrating and not limiting the scope of the invention. All such obvious changes and modifications are within the patented scope of the appended claims.

I claim:

1. A digital T-bevel comprising:
   an elongated blade having a slot along a part of its length;
   a handle having a housing with an end that is mounted to said blade both to move along the length of the slot and to pivot to an angle relative to the blade longitudinal axis, said handle housing also having;
   (a) a guide member that slides in said blade slot and rotates relative to said handle;
   (b) an encoder to produce electrical signals corresponding directly to the angle of the handle relative to the blade longitudinal axis, said encoder having first and second parts that rotate relative to each other, said guide member being connected to said encoder first part and said handle being connected to said encoder second part so that rotation of the blade with respect to the handle causes the encoder first and second parts to rotate relative to each other, while still allowing the blade to slide with respect to the handle;
   (c) electronic circuitry to convert the electrical signals produced by said encoder into digital signals; and
   (d) a display responsive to said digital signals to visually display the numerical value of the measured angle.

2. The digital T bevel as claimed in claim 1 wherein said encoder second part is fixed in said handle and rotates relative to said encoder first part as said handle is rotated relative to said blade.

3. The digital T bevel as claimed in claim 1 wherein said encoder is of the rotary type and each of said encoder first and second parts has a pattern of electrical contacts that contact each other and produce different said electrical signals corresponding to the angle of said handle relative to the longitudinal axis of said blade.

4. The digital T bevel as claimed in claim 1 further comprising:
   a bolt having a head that rests on one side of said end of said handle housing and a shank that passes through said guide member and said encoder first and second parts; and a control knob on the other side of said end of said handle housing into which the end of said bolt shank is threaded, wherein loosening of said control knob on said bolt shank permits said handle to be moved along the length of said blade and to be pivoted relative to said blade.

5. The digital T bevel as claimed in claim 4 wherein said handle housing includes a slot along and through a part of its length into and through which said blade can be rotated.

* * * * *